United States Patent

Yamashita

Patent Number: 5,351,232
Date of Patent: Sep. 27, 1994

[54] PATH MONITORING SYSTEM FOR CROSS-CONNECT SYSTEM

[75] Inventor: Hiroshi Yamashita, Tokyo, Japan

[73] Assignee: NEC Corporation, Japan

[21] Appl. No.: 27,194

[22] Filed: Mar. 5, 1993

[30] Foreign Application Priority Data

Mar. 5, 1992 [JP] Japan .................. 4-083406

[51] Int. Cl.$^5$ .......................... H04J 3/14; H04L 1/24
[52] U.S. Cl. .......................... 370/14; 370/58.2; 370/17; 371/27
[58] Field of Search ............ 370/17, 14, 60, 60.1, 370/61, 66, 68, 13, 80, 55, 81, 58.3, 105.1, 59, 58.1, 53, 58.2, 105.4, 105.5; 371/20.4, 20.1, 24, 27, 15.1

[56] References Cited

U.S. PATENT DOCUMENTS

| | | | |
|---|---|---|---|
| 4,700,341 | 10/1987 | Huang | 370/80 |
| 4,712,209 | 12/1987 | Kuritani et al. | 370/13 |
| 5,033,044 | 7/1991 | William et al. | 370/55 |

*Primary Examiner*—Douglas W. Olms
*Assistant Examiner*—Huy D. Vu
*Attorney, Agent, or Firm*—Ostrolenk, Faber, Gerb & Soffen

[57] ABSTRACT

In a cross-connect system, test pattern insertion circuits are connected respectively to input line circuits to receive a sequence of frames each containing an idle timeslot and a sequence of data timeslots. Each insertion circuit is enabled at multiple frame intervals to insert a test pattern into the idle timeslot of one of the multiple frames. Time switches are associated respectively with output line circuits, each of the time switches comprising a plurality of memories connected respectively to the insertion circuits for receiving sequences of frames therefrom, and a selector connected to the memories. An incoming frame from each insertion circuit is written into the associated memories of each time switch, producing copies of the frame. Contents of the memories are then read on a per timeslot basis and the selector of each time switch is controlled to select one of the memories of the time switch to deliver a test pattern as well as data signals from the selected memory of each time switch to the associated output line circuit. Test pattern check circuits examines the delivered test patterns to evaluate the quality of paths from the input line circuits to the output line circuits.

3 Claims, 4 Drawing Sheets

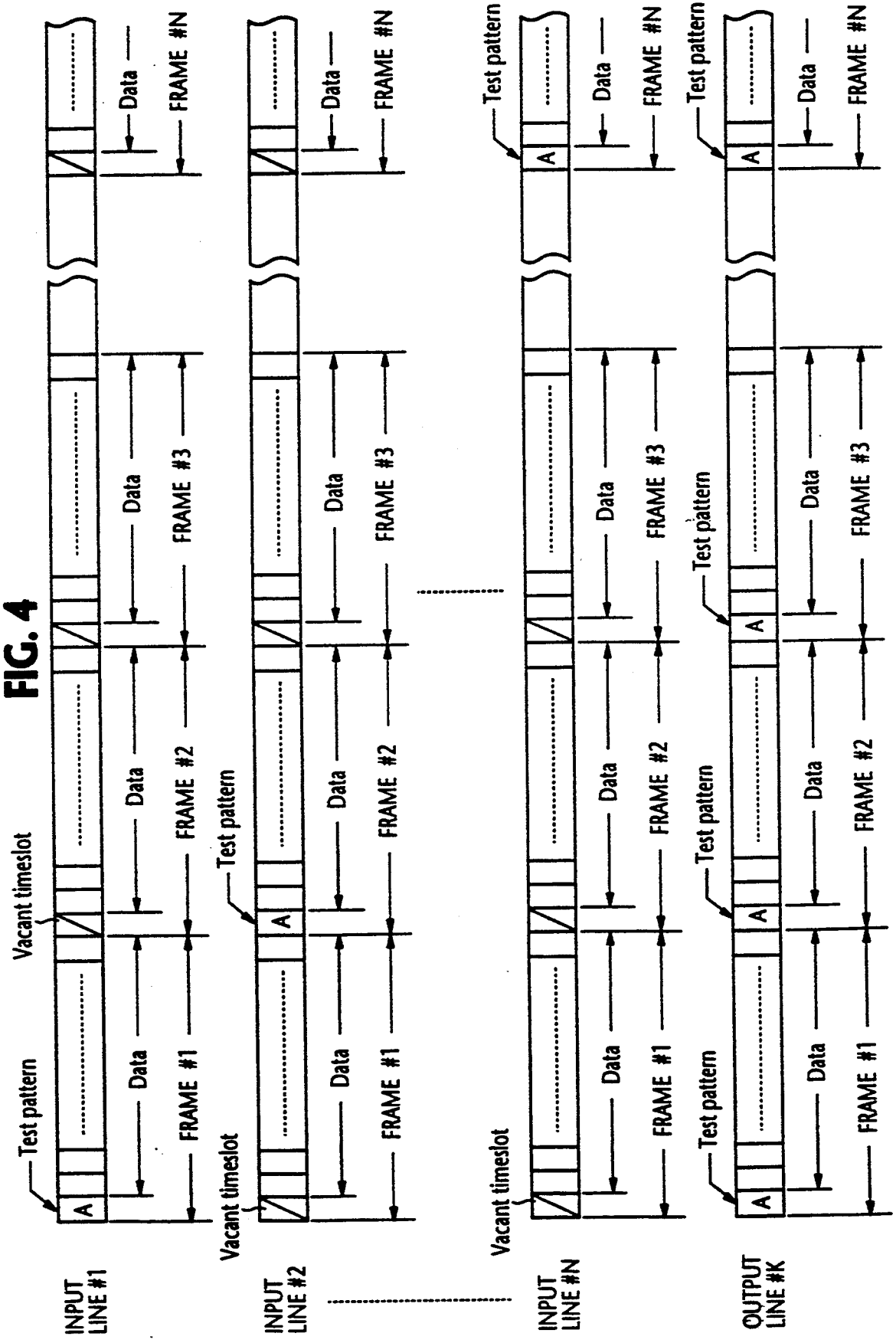

PATH MONITORING SYSTEM FOR CROSS-CONNECT SYSTEM

BACKGROUND OF THE INVENTION

1. Field of the Invention

The present invention relates generally to digital cross-connect systems of parallel time switch structure, and more specifically to a path monitoring system for the digital cross-connect system.

2. Description of the Related Art

A prior art digital cross-connect system of parallel time switch structure is shown in FIG. 1. In this system, TDM input lines #1-#N are respectively connected to test pattern insertion circuits $10_1 \sim 10_N$ to which test patterns are supplied from a multiple test pattern generator 17 so that a unique test pattern can be inserted into a particular timeslot of each TDM (time division multiplex) frame. Each TDM frame contains N idle timeslots and data timeslots (FIG. 2). Using frame and timeslot pulses from a timing generator 16, multiple test pattern generator 17 inserts a test pattern A into idle time slot #1 of each frame of line input #1 and a test pattern B into idle timeslot #2 of each frame of line input #2. Continuing in this way, a test pattern N is inserted into idle timeslot #N of each frame of input line #N. The outputs of the insertion circuits are connected respectively to identical time switches $11_1-11_N$ each comprising dual-port random access memories $20_1 \sim 20_N$ that are connected respectively to the outputs of insertion circuits $10_1-10_N$, so that N copies of the output signal of test pattern insertion circuit $10_i$ are sequentially stored into respectively corresponding RAM's $20_i$ of all time switches $11_1-11_N$ according to a lower-significant-bit output of an address control memory 14 driven by a timeslot counter 15. Each of the time switches 11 includes a selector 21 that is responsive to a higher-significant-bit output of control memory 14 to select one of the outputs of RAM's 20 and applies it to a corresponding one of test pattern check circuits $12_1 \sim 12_N$. The contents of address control memory 14 are altered or updated by commands from a network management system 13 according to varying network traffic or cable failures to switch incoming line to an alternate output line. For path monitoring purposes, address control memory 14 successively reads all test patterns A, B. . . N from all RAM's of each time switch 11. Each check circuit 12 determines whether each test pattern matches the original pattern in order to evaluate the quality of each all parallel signal paths of time switch at frame intervals. If a mismatch is detected, network management system 13 is notified of this fact to control the address control memory 14.

Since the prior art path monitoring system involves the use of N idle timeslots for each TDM input signal and N unique test patterns, the number of such timeslots and test patterns undesirably increases as input lines increase.

SUMMARY OF THE INVENTION

It is therefore an object of the present invention to provide a path monitoring system for a cross-connect system using a smaller number of timeslots.

According to a broader aspect of the present invention, a sequence of frames each containing an idle timeslot and data timeslots is received from each of N input line circuits and a test pattern is inserted into the idle timeslot of one of N successive frames. A plurality of time switches is provided, each having N inlets connected respectively to the N input line circuits and an outlet connected to a respective one of N output line circuits. Each of the time switches is controlled to transfer contents of frames on a per timeslot basis from any of the inlets to the outlet of the time switch. A plurality of test pattern check circuits connected respectively between the time switches and the output line circuits for examining the test patterns from the time switches to evaluate the quality of paths from the N input line circuits to the N output line circuits.

According to a specific aspect, the cross-connect system of the present invention comprises a plurality of insertion circuits connected respectively to input line circuits to receive a sequence of frames from the respective input line circuit, each of the frames containing an idle timeslot and a plurality of data timeslots. Each of the insertion circuits is enabled at multiple frame intervals to insert a test pattern into the idle timeslot of one of the multiple frames. Time switches are associated respectively with output line circuits, each of the time switches comprising a plurality of memories connected respectively to the insertion circuits for receiving sequences of frames therefrom, and selector connected to the memories. Incoming frames from the insertion circuit are sequentially written into the memories of each time switch to store copies of each incoming frame, and contents of the memories are read on a per timeslot basis. The selector of each time switch is controlled to select one of the memories of the time switch to deliver a test pattern as well as data signals from the selected memory. Test pattern check circuits are connected respectively to the output line circuits for examining the delivered test patterns to evaluate the quality of paths from the input line circuits to the output line circuits.

BRIEF DESCRIPTION OF THE DRAWINGS

The present invention will be described in further detail with reference to the accompanying drawings, in which:

FIG. 4 illustrates the TDM frame structure of the present invention.

DETAILED DESCRIPTION

Figure 1:
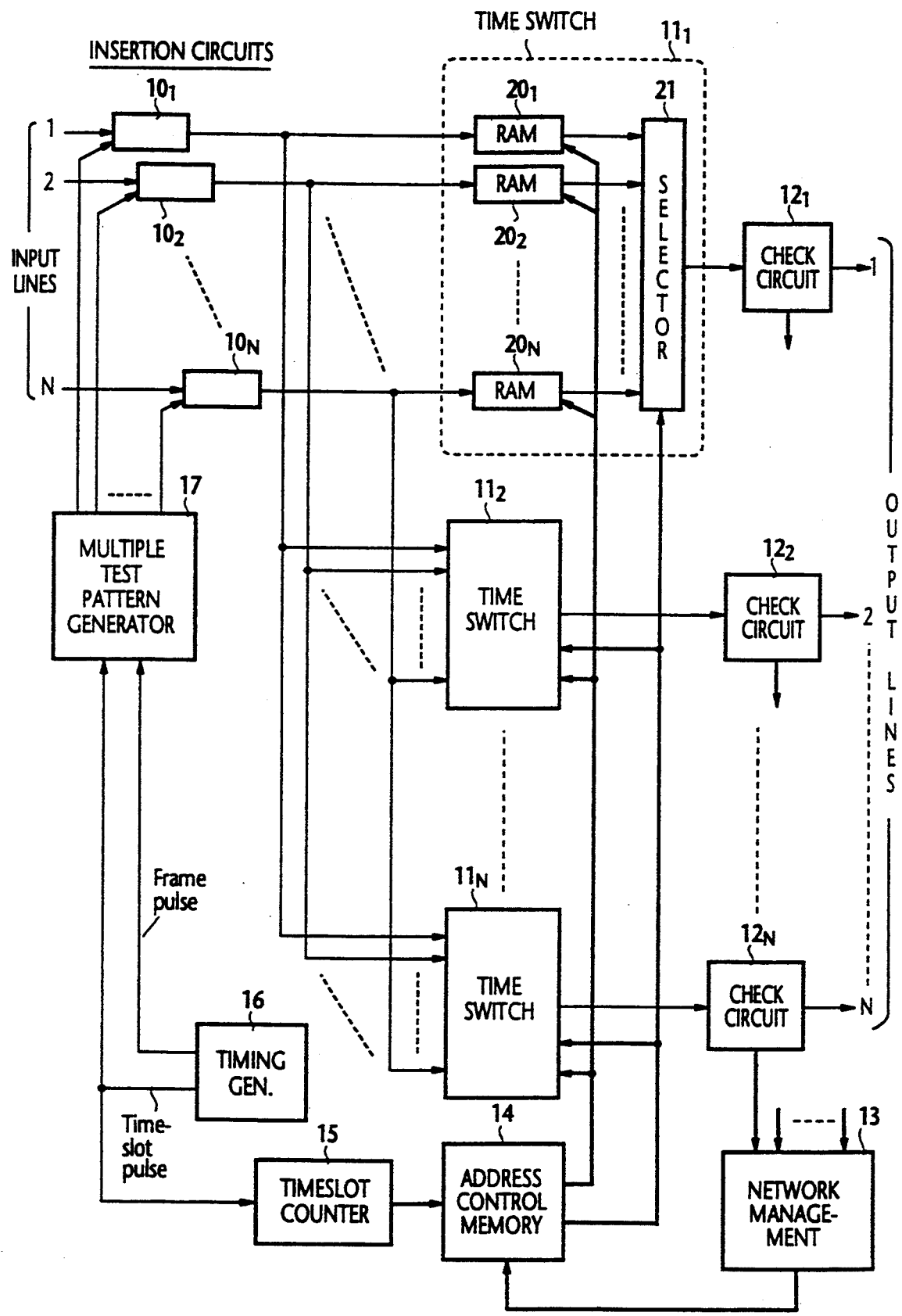
FIG. 1 illustrates in block diagram form a prior art digital cross-connect system of parallel switch structure.
Figure 2:
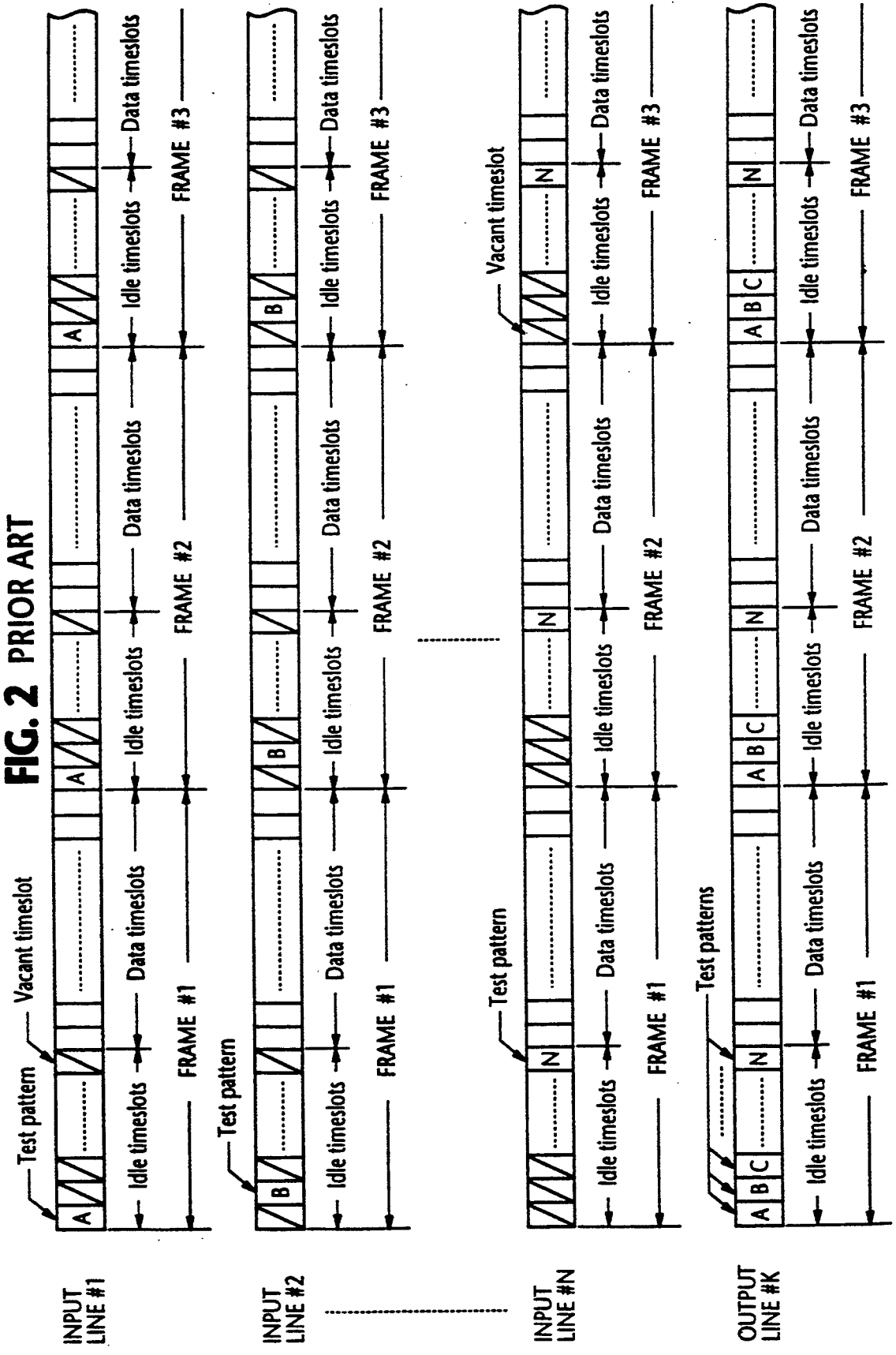
FIG. 2 illustrates the TDM frame structure of the prior art system.
Figure 3:
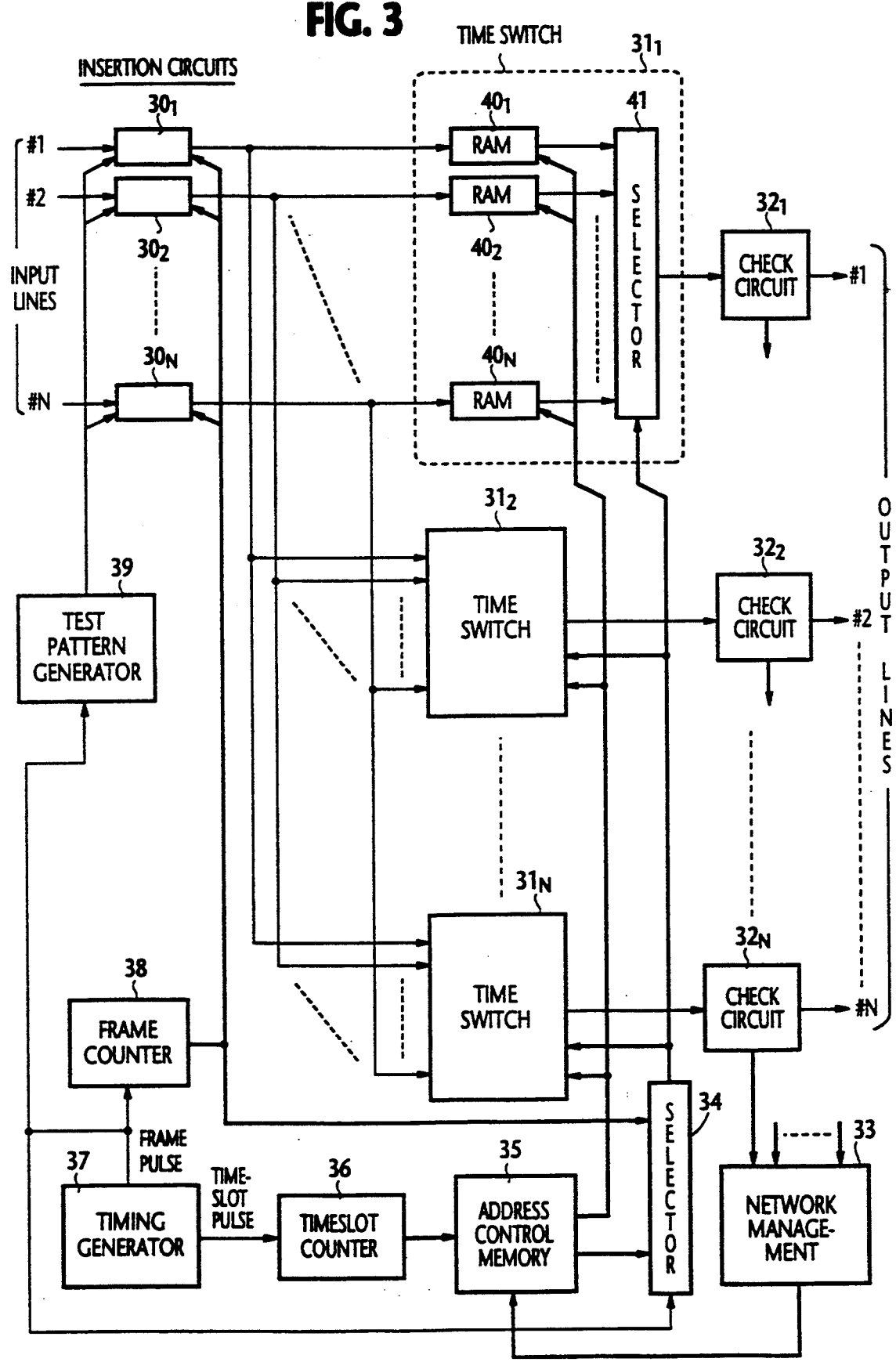
FIG. 3 illustrates in block diagram from the cross-connect system of the present invention.

Referring now to FIG. 3, there is shown a digital cross-connect system of parallel time switch structure according to a preferred embodiment of the present invention. The system comprises a plurality of TDM input lines #1-#N respectively including test pattern insertion circuits $30_1-30_N$ and time switches $31_1 \sim 31_N$, each comprising dual-port RAM's $40_1 \sim 40_N$ and selector 41. The output of time switches $31_1-31_N$ is connected to a respective one of output circuit lines #1~#N in which check circuits $32_1-32_N$ are respectively provided. Network management system 33 is connected to check circuits $32_1 \sim 32_N$ to receive results of a test pattern check.

Each of the test pattern insertion circuits $30_K$ (where K=1, 2. . . N) is identified by a line number and is supplied with a single test pattern from a test pattern generator 39 to insert it into the TDM data stream of each line circuit when the corresponding insertion circuit is enabled by the output of a frame counter 38. The outputs of the insertion circuits are respectively connected to the inputs of data memories or dual-port RAM's $40_1 \sim 40_N$ of each time switch $31_K$. Each of the RAM's 40 has a memory area divided into at least two subdivisions one for storing a frame and the other for storing a subsequent frame while, at the same time, allowing the previous frame to be read out of the RAM. Each RAM is controlled by the lower-significant-bit output of address control memory 35 for sequentially writing all incoming signals and for reading stored signals according to command signals from network management system 33. The outputs of the RAM's are connected to selector 41 to effect the transfer of signals from any input lines to any output lines on a per timeslot basis in accordance with the output of frame counter 38 or higher-significant-bit output of address control memory 35. A selector 34 is provided for selecting one of the outputs of frame counter 38 and control memory 35 in response to a frame pulse supplied from a timing generator 37 at the start of each frame interval. To perform the normal cross-connect functions the address control memory 35 is selected by selector 34 for application of its higher-significant-bit output to the selector 41 and to perform a test pattern detection from RAM's $40_1 \sim 40_N$ the frame counter 38 is selected for application of its output to the selector 41. Timing generator 37 further supplies the frame pulse to frame counter 38 and test pattern generator 39 as well as to selector 34, and generates a timeslot pulse for application to timeslot counter 36 so that the latter produces a timeslot count that can be used by address control memory 35 to produce address signals for all the RAM's.

The path monitoring operation of the present invention is as follows. Test pattern generator 39 supplies a test pattern A to all insertion circuits $30_1 \sim 30_N$ at the start of each frame interval in response to a frame pulse from timing generator 37. Frame counter 38 produces a binary frame count value in response to each frame pulse, the frame count value being reset to an initial value at every N frame intervals. When the frame count value matches the line number of each insertion circuit, the insertion circuit is enabled to insert the test pattern into the first timeslot of a frame which is identified by the frame count value. It is seen therefore that a test pattern A is inserted into a single timeslot, i.e., the first timeslot, of frame #K of input line #K as illustrated in FIG. 4. Address control memory 35 accesses all RAM's of each time switch $31_K$ to read stored test patterns A, and selector 34 couples a successive frame count value from frame counter 38 to the selector 41 of time switch $31_K$ in response to each frame pulse to apply the test patterns in sequence to the check circuit $32_K$. Each check circuit $32_K$ checks each test pattern against the original single test pattern A to evaluate the quality of the associated signal paths of the corresponding time switch $31_K$ at N-frame intervals.

The foregoing description shows only one preferred embodiment of the present invention. Various modifications are apparent to those skilled in the art without departing from the scope of the present invention which is only limited by the appended claims.

What is claimed is:

1. A cross-connect system having N input lines and N output lines, each of said N input lines supporting a sequence of frames each containing an idle time slot and data time slots, comprising:

a test pattern generator for generating a single test pattern;

timing means for cyclically generating an incremental count value at frame intervals, said count value identifying each of said input lines;

N insertion means connected respectively to corresponding ones of said input lines for receiving the N frame sequences therefrom and said test pattern from said test pattern generator, each of the insertion means being responsive to said count value for inserting the received test pattern into the idle time slot of one of the frames of the received sequence when the corresponding input line is identified by said count value, so that N test patterns are sequentially and respectively inserted into the N frame sequences;

a plurality of time switches, each having N inlets corresponding respectively to said input lines for receiving said N sequences of frames respectively from said N insertion means, and an outlet;

control means for controlling each of said time switches for transferring the data time slots of each frame on a per time slot basis from any of the inlets of the time switch to the outlet thereof according to an address pattern and transferring one of said N test patterns contained in N frame sequences from one of the N inlets of the time switch to the outlet thereof when the input line corresponding to said one of the N inlets is identified by said count value; and a plurality of test pattern check circuits connected respectively between the outlets of said time switches and said output lines for examining the test patterns from the time switches to evaluate the quality of paths from said N input lines to said N outputs lines, said control means making a change in said address pattern according to the quality of said paths evaluated by the test pattern check circuits.

2. A cross-connect system as claimed in claim 1, wherein said idle time slot is identical in position in each frame of said N sequences.

3. A cross-connect system having input lines and output lines, comprising:

a test pattern generator for producing a single test pattern at frame intervals;

a plurality of insertion means connected respectively to the input lines for receiving therefrom a plurality of sequences of frames, each containing an idle time slot and a plurality of data time slots and receiving the test pattern from said test pattern generator;

a plurality of time switches associated respectively with said output lines, each of the time switches comprising a plurality of memories connected respectively to said insertion means for respectively receiving said sequences of frames therefrom, and a selector connected to said memories;

memory address means for sequentially writing incoming frames from said insertion means into the memories of each of the time switches according to an address pattern, so that copies of each of the incoming frames are stored in said memories and reading contents of said memories on a per time slot basis according to said address pattern;

timing means for cyclically generating an incremental count value at frame intervals;

control means for enabling one of said insertion means identified by said count value to insert the received test pattern into the idle time slot of one of the frames of the received sequence so that a plurality of test patterns are sequentially and respectively inserted into said sequences of frames, for causing the selector of each of the time switches to select any of said memories for delivering data time slots from the selected memory, and causing the selector of the time switch to select one of the memories of the time switch identified by said count value for delivering one of the test patterns from the selected memory; and a plurality of test pattern check circuits connected respectively between said time switches and said output lines for examining the delivered test pattern to evaluate the quality of paths from said input lines to said output lines;

said control means being responsive to the quality of said paths evaluated by the test pattern check circuits for making a change in said address pattern of said memory address means.

* * * * *